US012784416B2

(12) United States Patent
Tolstaya et al.

(10) Patent No.: US 12,784,416 B2
(45) Date of Patent: Nov. 3, 2026

(54) SYSTEMS AND METHODS FOR PREPARING A LITHOLOGICALLY BALANCED TRAINING SET

(71) Applicant: SAUDI ARABIAN OIL COMPANY, Dhahran (SA)

(72) Inventors: Ekaterina Tolstaya, Moscow (RU); Mokhles M. Mezghani, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 239 days.

(21) Appl. No.: 18/699,139

(22) PCT Filed: Apr. 13, 2023

(86) PCT No.: PCT/RU2023/000116
§ 371 (c)(1),
(2) Date: Apr. 5, 2024

(87) PCT Pub. No.: WO2024/215216
PCT Pub. Date: Oct. 17, 2024

(65) Prior Publication Data
US 2025/0239055 A1 Jul. 24, 2025

(51) Int. Cl.
*G06V 10/774* (2022.01)
*G06V 10/764* (2022.01)
*G06V 20/64* (2022.01)

(52) U.S. Cl.
CPC .......... *G06V 10/774* (2022.01); *G06V 10/764* (2022.01); *G06V 20/64* (2022.01)

(58) Field of Classification Search
CPC ...................................................... G06V 10/82
See application file for complete search history.

(56) References Cited

U.S. PATENT DOCUMENTS 4,554,649 A 11/1985 Herkenhoff et al.
4,692,910 A 9/1987 Sondergeld et al.
(Continued)

FOREIGN PATENT DOCUMENTS

CN 111563445 A * 8/2020 ............. G06N 3/045
CN 111783825 A 10/2020
WO 2022032057 A1 2/2022

OTHER PUBLICATIONS

K. Chawshin et al., "Lithology classification of whole core CT scans using convolutional neural networks," SN Applied Sciences, 2021, vol. 3, No. 668 (21 pages).
(Continued)

*Primary Examiner* — Di Xiao
(74) *Attorney, Agent, or Firm* — Osha Bergman Watanabe & Burton LLP

(57) ABSTRACT

A method for training a machine learning engine from a balanced training set is provided. The method includes receiving a plurality of images of cuttings from a geological formation, generating a lithology vector associated with each image of the plurality of images to form an image/vector set comprising a plurality of image/vector pairs, the lithology vector comprising a plurality of rock types and a percentage of each of the plurality of rock types identified in a respective image, and balancing the image/vector set based on an occurrence of the plurality of rock types across the plurality of image/vector pairs to generate the balanced training set.

14 Claims, 4 Drawing Sheets

(56) References Cited

U.S. PATENT DOCUMENTS

| | | | | |
|---|---|---|---|---|
| 4,907,206 | A | 3/1990 | Rai et al. | |
| 9,016,399 | B2 | 4/2015 | Pelletier et al. | |
| 9,230,194 | B2 | 1/2016 | Rabinovich et al. | |
| 11,263,482 | B2 | 3/2022 | Schwartz et al. | |
| 11,315,228 | B2 * | 4/2022 | Vaidyanathan | G06V 20/70 |
| 11,443,149 | B2 | 9/2022 | Francois et al. | |
| 2002/0120401 | A1 | 8/2002 | Macdonald et al. | |
| 2011/0002194 | A1 | 1/2011 | Imhof et al. | |
| 2014/0110167 | A1 | 4/2014 | Goebel et al. | |
| 2015/0218914 | A1 | 8/2015 | Marx et al. | |
| 2016/0130928 | A1 | 5/2016 | Torrione | |
| 2019/0383965 | A1 | 12/2019 | Salman et al. | |
| 2020/0157929 | A1 | 5/2020 | Torrione | |
| 2020/0278465 | A1 | 9/2020 | Salman et al. | |
| 2021/0319257 | A1 * | 10/2021 | Francois | G01N 15/088 |
| 2023/0154150 | A1 * | 5/2023 | Barton Martinelli | G06V 10/56 382/108 |
| 2023/0374903 | A1 * | 11/2023 | Al-Qubaisi | E21B 49/005 |

OTHER PUBLICATIONS

International Search Report and Written Opinion issued in corresponding International Application No. PCT/RU2023/000116, dated Jan. 10, 2024 (7 pages).

* cited by examiner

SYSTEMS AND METHODS FOR PREPARING A LITHOLOGICALLY BALANCED TRAINING SET

BACKGROUND

Lithology is an important property characterizing oil and gas reservoirs and is therefore, desirable to understand for any given geological formation. Lithology for a formation may be obtained from drill cuttings that are uplifted during drilling. To determine the lithology from such cuttings, a visual presentation of the cuttings may be undertaken by making a digital image using a microscope in a visible range of the light spectrum, for example.

Formation lithology is typically estimated during drilling since it can be a guide to the location of oil and gas bearing formations. Various methods have been proposed for lithology estimation using, for example, estimating formation lithology from measures of formation anisotropy. In addition, lithology identification has been based on convolutional neural network learning using well log data, such as, for example, values of natural potential, natural gamma ray, well diameter, deep induction, eight lateral directions, acoustic time difference, compensation neutrons and volume density. This data can be expensive to acquire and is not always readily available.

In contrast, visual data of uplifted drill cuttings is relatively easy to obtain, and lithology prediction from visual data, such as digital images or video has been described. For example, a system where drill cuttings are captured on a shale shaker in video format, and then different characteristics (e.g., size, shape, etc.) of particles are detected and a user alerted in case of adverse drilling conditions. These systems typically operate using video of non-washed cuttings, thereby making it difficult or impossible to determine lithology content at the particle level.

Additionally, digital images and video of cuttings are typically recorded with uniform sampling with respect to depth, for each drilled well. However, lithology content (amount of different rock types) of wells varies from well-to-well, and when sampling uniformly, some rock types may be overrepresented while others are underrepresented. As a consequence, the amount of different rock types in a dataset can vary significantly and affect precision and accuracy of a prediction from a machine learning engine so trained.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This application relates to systems and methods for preparing a training dataset for a machine learning engine. More particularly, the application relates to balancing rock type occurrences across a plurality of training images to result in a more accurate training dataset.

Embodiments disclosed herein relate to improvements in automation for lithology detection, by providing a more robust training dataset having an improved balance between actual presence of rock types, greater precision and accuracy of automated lithology identification. Further, for training a neural network that is able to give accurate prediction on the input digital images, the training dataset in the form of image and known lithology data should be representative for each rock type present in the formation.

In one aspect, embodiments disclosed herein relate to a method for training a machine learning engine from a balanced training set. The method includes receiving a plurality of images of cuttings from a geological formation, generating a lithology vector associated with each image of the plurality of images to form an image/vector set comprising a plurality of image/vector pairs, the lithology vector comprising a plurality of rock types and a percentage of each of the plurality of rock types identified in a respective image, and balancing the image/vector set based on an occurrence of the plurality of rock types across the plurality of image/vector pairs to generate the balanced training set.

The balancing may be configured to account for underrepresented rock types in one or more of the image/vector pairs.

The balancing may include determining a vector sum across the plurality of lithology vector pairs for each of the plurality of rock types and a lower sum threshold value, in response to determining that a respective vector sum is less than the lower sum threshold value, excluding from the image/vector set, all rock types having a vector sum less than the lower sum threshold value to generate a modified image/vector set, determining a repetition vector based on the modified image/vector set and the plurality of rock types, and repeating and storing each image/vector pair in the image/vector set according to the repetition vector.

The excluding may include one of flagging each rock type associated with the respective vector sum as unknown or removing all image/vector pairs having a vector sum less than the lower sum threshold value.

Determining the repetition vector may include determining a minimization factor corresponding to a most nearly equal representation of rock types, generating a matrix having each lithology vector as a row, determining a mean value of each lithology vector, and rounding off each percentage based on the mean value and the minimization factor.

Rock types flagged as unknown may be summed together within the image/vector set.

Each of the images may be linked to a depth in the geological formation at which a respective cutting was obtained.

The sum of each lithology vector may be equal to 1.

The method may further include training the machine learning engine following the balancing.

The method may further include providing the balanced training set to the machine learning engine to train the machine learning engine.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
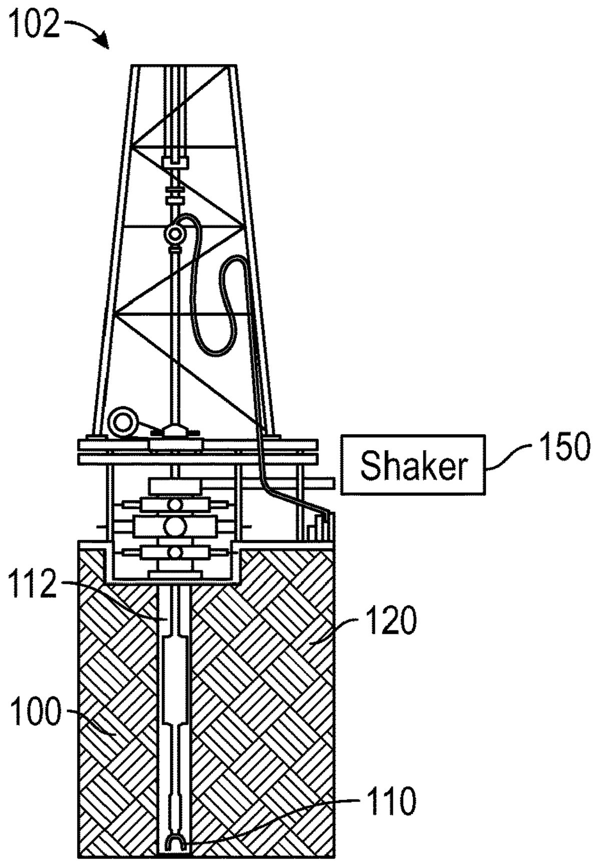
FIG. 1 shows an illustrative drilling system operating within a geological formation according to embodiments of the present disclosure.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-6, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a well" includes reference to one or more of such well.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

The subject matter of the dependent claims of one or more embodiments may be combined with other dependent claims except where otherwise contradictory.

Embodiments disclosed herein provide a new methodology of forming a more balanced heterogenous lithology dataset from lithology data obtained during a drilling operation for training a machine learning model. By creating a plurality of lithology vectors in which an image containing a plurality of lithologies is linked to the lithologies contained therein, and then manipulating representation of the determined lithologies based on their presence throughout the set, more accurate training of a machine learning model may be performed, resulting in more accurate and desirable output from the machine learning model.

FIG. 1 shows an illustrative drilling system 102 operating within a geological formation 100 according to embodiments of the present disclosure. While drilling through the subsurface 120 of the geological formation 100, rocks crushed by the drill-bit 110 can be carried by formation fluid (e.g., water, oil, and/or gas) up the wellbore by drilling mud 112. The formation cuttings can be collected at, for example, a shale shaker 150 where the drilled cuttings are separated from the liquid drilling mud 112.

The collected cuttings from the drilling operation once collected at the shaker 150 may undergo various operations. For example, the cuttings may be photographed (e.g., digitally) and analyzed, the analysis including, for example, visual and/or microscopic determination of rock types comprised by the cuttings. As a function of the analysis, a percentage of each identified rock type making up the imaged sample may be determined. For example, analysis may be performed by an expert (e.g., a geologist) trained to identify rock types from images of the cuttings and percentages of each rock type may be determined based on visual inspection by the expert. Alternatively, or in addition, chemical analysis may be performed to determine rock types and percentages present in each image. The rock type information determined for each image may then be linked to the image as ground truth information for the respective image.

From the cutting images and ground truth data determined as above, lithology vectors associated with each image of the plurality of images can be generated, respectively, to form an image/vector set (original lithology dataset) including a plurality of image/vector pairs. As stated above, the lithology vector comprises a percentage of each rock type identified in a respective image, the vector being linked to the image to form the image/vector pair.

Figure 2:
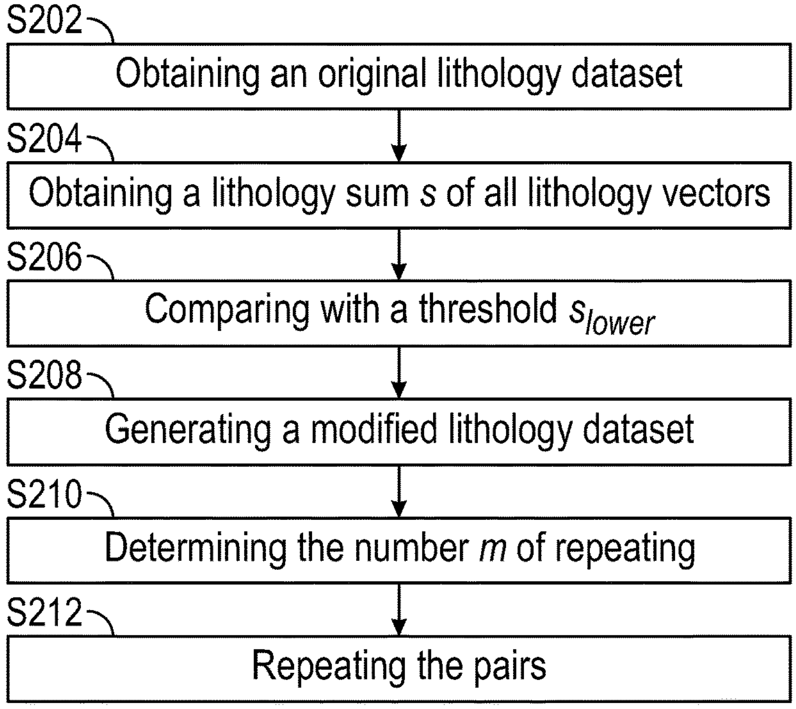
FIG. 2 shows a flowchart illustrating a method for balancing rock type representation in a lithology dataset in accordance with one or more embodiments.

FIG. 2 shows a flowchart illustrating a method for balancing rock type representation in a lithology dataset in accordance with one or more embodiments. This method can be implemented and performed by a system which includes a processor and a non-transitory computer readable medium, such as the device described in greater detail below with reference to FIG. 6. The non-transitory computer readable medium can store instructions that when executed by the processor cause the processor to perform the method.

Figure 3:
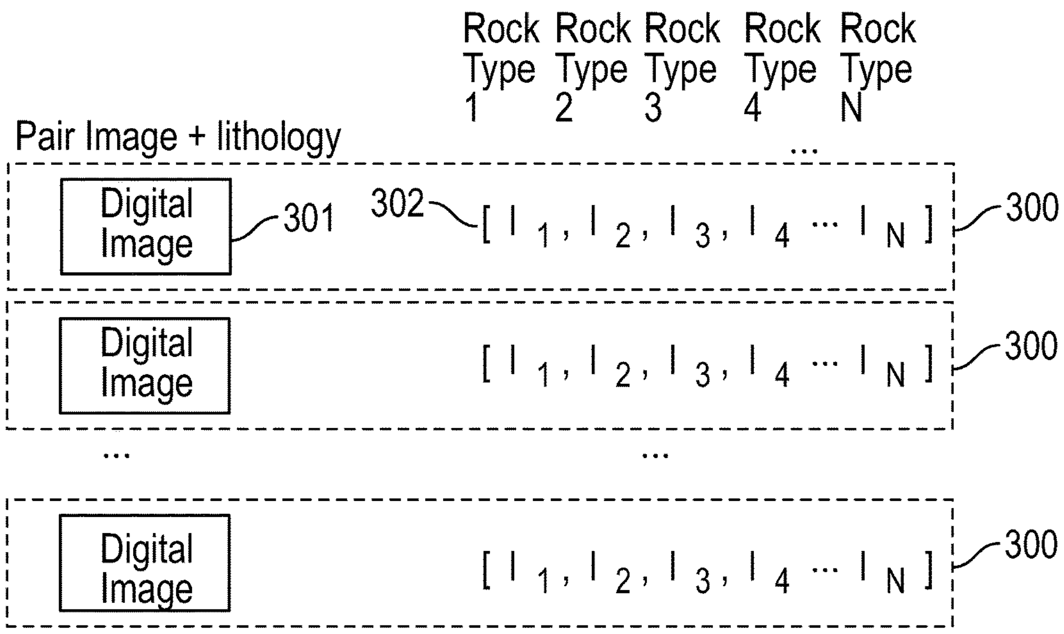
FIG. 3 shows the structure of an original lithology dataset including image/vector pairs, in accordance with one or more embodiments.

As shown in FIG. 2, at step S202, an original lithology dataset comprising a plurality of lithology vectors associated with cuttings (e.g., drill cuttings) taken from a geologic formation, is obtained. FIG. 3 shows a schematic diagram illustrating the structure of the original lithology dataset in accordance with one or more embodiments.

An original lithology dataset includes image/vector pairs where a length of each vector 302 may be equal to a predetermined number of possible rock types in the lithologies identified. For example, as shown at FIG. 3, a length of the vector N corresponds to N number of possible rock types within any given digital image corresponding to a sample (e.g., drill cuttings). N may be determined based on one or more of the digital images 301, for example, where 10 rock types are identified in a sample, N is set equal to 10. Similarly, where 5 rock types are identified, N is set equal to 5. According to some embodiments the value of N may range between 2 and 30.

Each lithology vector 302 can be expressed as $$l = \{l_i\}_{i=1}^{N},$$

where each component $l_i$ of a vector (vector component or lithology vector component) corresponds to a percentage of a specific rock type present in the sample depicted on the corresponding digital image under consideration. For example, the sum of any particular lithology vector may be set to sum to 100, and given the known value of N, the percentage of each of the rock types in the lithology vector can be determined.

According to some embodiments, a value of a particular lithology vector component h can be determined based solely on the image of the drill cuttings obtained from a particular geological formation. According to other embodiments, the value of the lithology vector component h can be obtained by some other methods, for example, expert opinion (e.g., upon review of the cuttings and/or the images), chemical testing of the cuttings, additional measured data obtained from the cuttings, etc.

As shown in FIG. 3, the original lithology dataset 300 can be obtained in a form of J pairs of a digital image of a cutting and a lithology vector determined based on the cutting in the respective digital image. The J pairs can be chosen randomly, for example, with a uniform distribution. For example, J pairs can be randomly selected J from the dataset such that every pair from the resulting dataset is equally likely to be chosen, thereby resulting in the uniform distribution.

Each of the image/vector pairs of an image/vector set may be linked to a depth at which the cutting corresponding to the image/vector pair was obtained. For example, a cutting obtained a first depth of 200 meters is imaged and a lithology vector created with meta-data indicating a depth of 200 meters, while a second cutting obtained at 300 meters may be imaged and a lithology vector created with meta-data indicating a depth of 300 meters. Depths and cutting counts are not intended as limited and are illustrative only.

The described techniques for obtaining the original lithology dataset 200 are intended as illustrative only, and the original lithology dataset 200 can be obtained using any suitable method based on the cuttings obtained from the geological formation.

An original lithology dataset 300 can be prepared as described above and obtained by the system from an external source using, for example, a touch panel, a screen, and a mouse (e.g., for providing one or more files to be uploaded), or according to some embodiments, an internet linking module for downloading from the Internet. For example, the processor can receive a plurality of images of cuttings from a geological formation obtained, for example, during a drilling operation, as noted above.

Returning to FIG. 2, in step S204, with respect to each of the possible rock types, a lithology sum s of all lithology vectors from the original lithology dataset is obtained. The lithology sum s may be calculated using the following equations:

$$s = \{s_i\}_{i=1}^{N}$$

$$s = \{s_i\}_{i=1}^{N} \qquad \text{Equation (1)}$$

$$s_i = \sum_{k=1}^{J} l_k \qquad \text{Equation (2)}$$

Based on N number of rock types, the lithology sum s comprises a vector with length N. The lithology sum s is the sum of J lithology vectors l. Each rock type i has a respective vector sum $s_i$ defined as shown in equation (2).

In step S206, each of the N components of lithology sum s may be compared with a threshold sum $s_{lower}$ (also referred to herein as "lower sum threshold value") corresponding to a minimum sum chosen to designate an underrepresented rock type. In other words, where a component of lithology sum s for a rock type falls below the chosen threshold sum $s_{lower}$, the corresponding rock type may be designated as underrepresented. The threshold sum $s_{lower}$ may be determined, for example, as an n %-percentile of the vector sums across the original lithology dataset. According to one example, the lower bound $s_{lower}$, is determined as 1% percentile of all pairs in the dataset.

In step S208, in response to determining that one or more components of lithology sum s is less than the lower sum threshold value $s_{lower}$, i.e., that an underrepresented rock type is present in the dataset, a modified lithology dataset is generated. According to one or more embodiments, the modified lithology dataset may be generated by, for example, excluding from each of the image/vector pairs in the dataset, all of the rock types identified as underrepresented (i.e., those having a lithology sum component $s_i$ less than the lower sum threshold value $s_{lower}$.) Any suitable method for excluding the image/vector pairs may be implemented, for example, flagging each rock type associated with the respective vector sum as unknown by creating a new "unknown" label type, removing all image/vector pairs having a vector sum less than the lower sum threshold value, etc. As a result of the exclusion operation, the lithology sum component $s_i$ of each of the rock types remaining in the modified dataset exceeds the lower sum threshold value $s_{lower}$, and there should be no remaining underrepresented rock types.

Figure 4A:
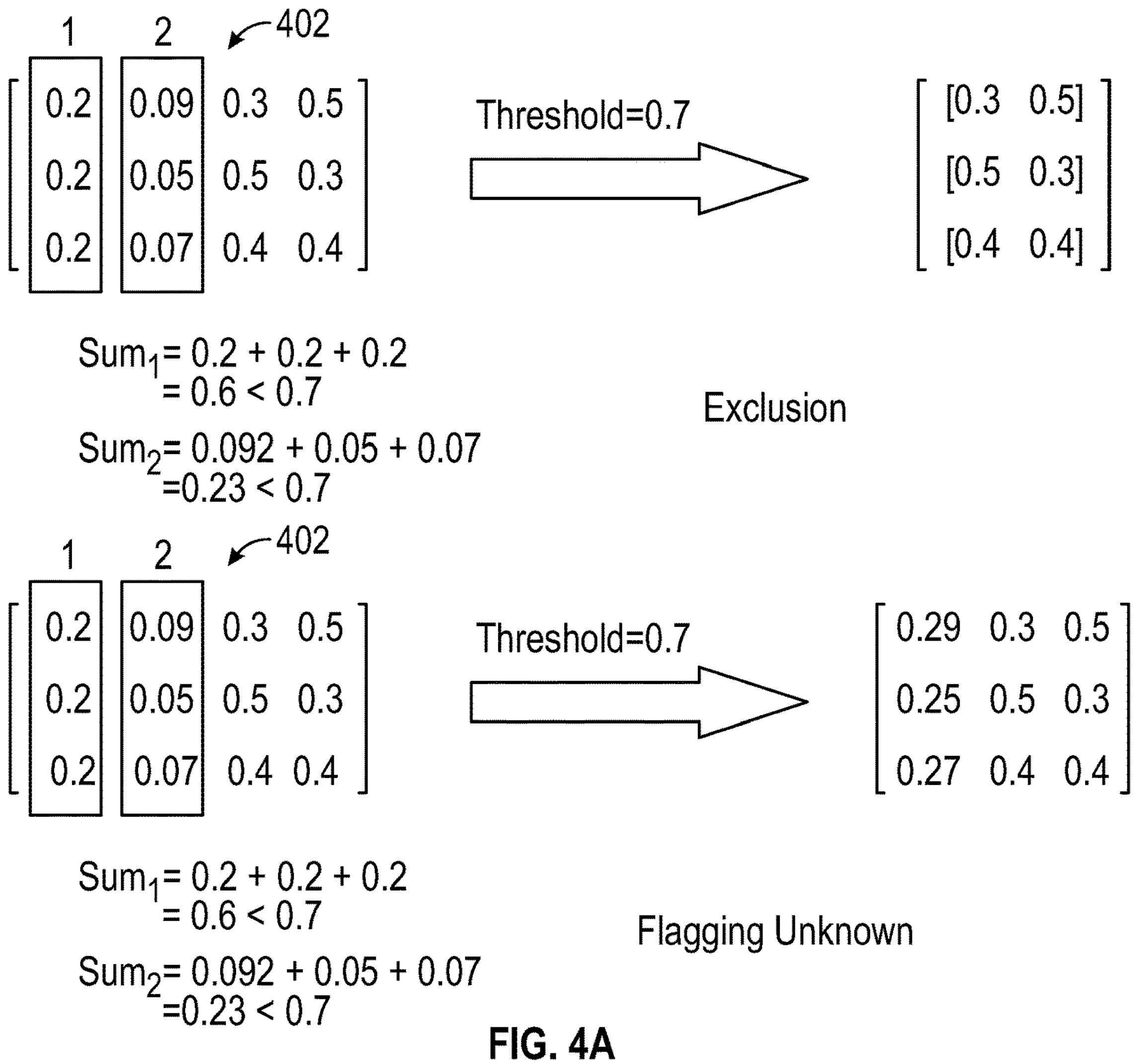
FIG. 4A shows a schematic diagram illustrating the exclusion of rock types having a vector sum less than a lower sum threshold value from a modified lithology dataset.

FIG. 4A shows a schematic diagram illustrating the exclusion of rock types having a vector sum $s_i$ less than the lower sum threshold value $s_{lower}$. As seen from FIG. 4A, assume that the number of rock types N is 3 and the number of vector pairs J is also 3. If the original vectors 402 in the training set are represented as $$\begin{bmatrix} 0.2 & 0.09 & 0.3 & 0.5 \\ 0.2 & 0.05 & 0.5 & 0.3 \\ 0.2 & 0.07 & 0.4 & 0.4 \end{bmatrix},$$

and the lower sum threshold value is 0.7, then the vectors of the modified dataset can be represented as $$\begin{bmatrix} 0.3 & 0.5 \\ 0.5 & 0.3 \\ 0.4 & 0.4 \end{bmatrix},$$

in case the option of removing all image/vector pairs having a vector sum less than the lower sum threshold value was implemented. In case the option of flagging the rock types associated with underrepresented values was implemented, the corresponding components of lithology vectors are summed, then removed from data, and the sum is added as an additional component, corresponding to rock type "unknown". For example, original lithology vectors 402 as $$\begin{bmatrix} 0.2 & 0.09 & 0.3 & 0.5 \\ 0.2 & 0.05 & 0.5 & 0.3 \\ 0.2 & 0.07 & 0.4 & 0.4 \end{bmatrix}$$

are transformed to $$\begin{bmatrix} 0.29 & 0.3 & 0.5 \\ 0.25 & 0.5 & 0.3 \\ 0.27 & 0.4 & 0.4 \end{bmatrix}$$

with the first component corresponding to the "unknown" rock type. This is based on the fact that the sum of the first rock type (as shown in the first column) totals to only 0.6, while the remaining rock types of the second and third columns are greater than 0.7.

In step S210, a repetition vector $$m = \{m_i\}_{i=1}^{J}$$

for the image/vector pairs of the modified dataset is determined. The repetition vector m has integer non-negative components, where every component $m_i$ corresponds to the number of times a corresponding image/vector pair should be repeated within a "balanced" training dataset generated according to embodiments of the present disclosure. According to some embodiments, the repetition vector m can be calculated according to the following steps. First, x is found as a solution to the following minimization problem:

$$Mx - \overline{Mx} \xrightarrow{x} \min, \qquad \text{Equation (3)}$$

where M is a matrix having columns formed by each of the lithology vectors from the image/vector pairs of the modified lithology dataset generated above. Mx is matrix-vector multiplication. $\overline{Mx}$ corresponds to a mean value of vector Mx, a scalar value. The value x is a vector of length J, i.e., the number of image-vector pairs of the dataset. The minimization problem may be solved by any suitable method, such as, for example, a least squares method, a steepest descent method, a conjugate gradient method, etc. $\overline{Mx}$ is the average (or mean) value of vector M*x, where M is a matrix (M columns, and N' rows, where N' is the number of rock types after underrepresented rock types have been removed or flagged. When matrix M is multiplied by vector x, a vector of length N' results and the scalar value or mean of the vector M*x is determined.

Then, m can be calculated as:

$$m = \left[\frac{|x|}{\min(|x|)}\right], \qquad \text{Equation (4)}$$

where [ ] means rounding off every vector component.

For example, if x is determined to be {−0.1, 0.1, 2, 5, 10}, then m is determined as {1, 1, 20, 50, 100}.

Figure 4B:
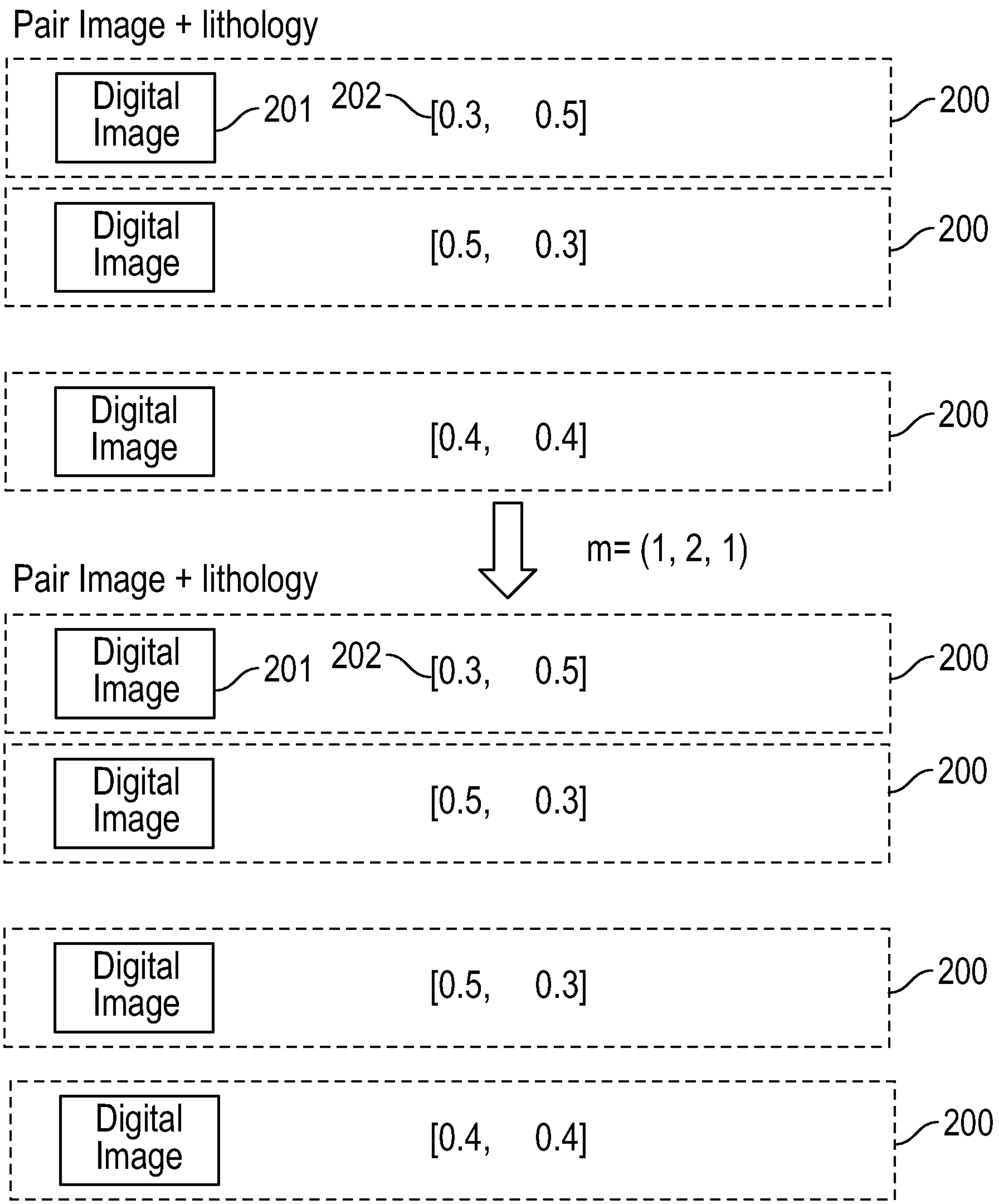
FIG. 4B shows a schematic diagram illustrating repetition of image/vector pairs to create a balanced training dataset.

At step S212, a balanced training dataset is obtained by repeating the image/vector pairs in modified training dataset based on the determined value of m for each of the remaining image/vector pairs in the modified set. In other words, an $i^{th}$ image/vector pair is repeated $m_i$ times, as determined above, within the balanced training set being generated. FIG. 4B shows a schematic diagram illustrating repetition of image/vector pairs for generating a balanced training set. For example, as shown by FIG. 4B, when the repetition vector m is determined as above to be (1, 2, 1), the first image/vector pair and third image vector pair are not repeated, i.e., they appear only once in the balanced set. In contrast, the second image/vector pair appears twice in the balanced training set. As another example, where the repetition vector m is determined as above to be (3, 1, 5), the first image/vector pair would be repeated 3 times interspersed within the balanced training dataset while the third image/vector pair would be repeated 5 times interspersed within the balanced training dataset. The second image/vector pair would not be repeated and would appear only once. These values are intended as illustrative only, and the value of m may be any resulting value as determined by the process above.

Embodiments of the present disclosure make it possible to generate a larger training set with a more balanced assortment of rock types therein. As a result, training for a neural network configured to predict lithology from digital image of drill cuttings can be improved, thereby improving accuracy and precision of the output of the trained neural network.

Figure 5:
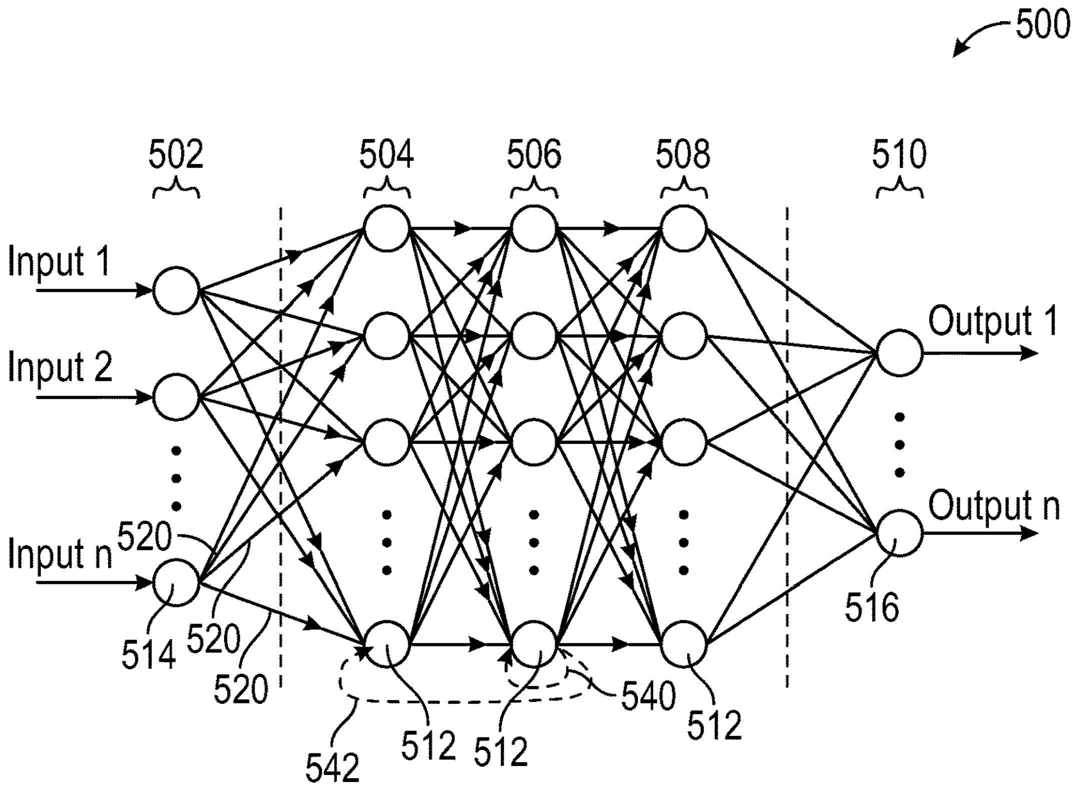
FIG. 5 shows an illustrative architecture for a neural network configured for lithology content predictions according to embodiments of the present disclosure.

FIG. 5 shows an illustrative architecture for a neural network that may be implemented as a machine learning engine, and configured for lithology content predictions, for example, by generation and training of a model based on the balanced training dataset generated above. A neural network 500 uses a series of mathematical functions to make predictions based on the balanced training dataset (observed data). A neural network 500 may include an input layer 502, hidden layers, such as a first hidden layer 504, a second hidden layer 506, a third hidden layer 508, and an output layer 510. Each layer represents a vector where each element within each vector is represented by an artificial neuron, such as artificial neurons 512 (hereinafter also "neuron"). The input layer 502 may receive an observed data vector x where each neuron, such as neuron 514, within the input layer 502 receives one element $x_i$ within x. Each element is a value that represents a datum that is observed. The vector x may be called "input data". FIG. 5 displays the input data or vector x as elements $x_1$, $x_2$, $x_i$ . . . $x_n$, where $x_1$ may be a digital image representing a sample at a first depth, and $x_2$ may be a digital image representing a sample at a second depth, etc.

The output layer 510 may represent the vector y where each neuron, such as neuron 516, within the output layer 510 represents each element $y_j$ within y. The vector y may be called "output data." FIG. 5 displays the output data or vector y with t elements, where an element $y_j$ may be a value that represents the lithology content of $j^{th}$ rock type in the sample. For example, $y_1$ and $y_2$ may represent the lithology content of the first rock type and the second rock type, respectively. In this embodiment, the neural network 500 may solve a regression problem where all outputs $y_t$ may depend on a temporal or spatial configuration as determined from the components and characteristics determined as described above.

Neurons in the input layer 502 may be connected to neurons in the first hidden layer 504 through connections, such as connections 520. A connection 520 may be analogous to a synapse of the human brain and may have a weight associated to it. The weights for all connections 520 between the input layer 502 and the first hidden layer 504 make up a first array of weights w, with elements $w_{ik}$:

$$w = \begin{bmatrix} w_{11} & w_{12} & w_{1k} & w_{1L} \\ w_{21} & w_{22} & w_{2k} & w_{2L} \\ w_{i1} & w_{i2} & w_{ik} & w_{iL} \\ w_{n1} & w_{n2} & w_{nk} & w_{nL} \end{bmatrix}, \quad \text{Equation (5)}$$

where k indicates a neuron in the hidden first hidden layer and L is the total number of neurons in the first hidden layer for the embodiment shown in FIG. 5. The elements in each column are the weights associated with the connections 520 between each of the n elements in vector x that propagate to the same neuron k 512 in the first hidden layer 504. The value of a neuron k, $a_k$, in the first hidden layer may be computed as $$a_k = g_k\left(b_k + \sum_i x_i w_{ik}\right), \quad \text{Equation (6)}$$

where, in addition to the elements of the input vector x and the first array of weights w, elements from a vector b, which has a length of L, and an activation function $g_k$ are referenced. The vector b represents a bias vector and its elements may be referred to as biases. In some implementations, the biases may be incorporated into the first array of weights such that Equation (5) may be written as $a_k = g_k(\Sigma_i x_i w_{ik})$.

Each weight $w_{ik}$ within the first array of weights may amplify or reduce the significance of each element within vector x. Some activation functions may include the linear function g(x)=x, sigmoid function $$g(x) = \frac{1}{1 + e^{-x}},$$

and rectified linear unit function g(x)=max(0,x), however, many additional functions are commonly employed. Every neuron in a neural network may have a different associated activation function. Often, as a shorthand, activation functions are described by the function $g_k$ by which it is composed. That is, an activation function composed of a linear function may simply be referred to as a linear activation function without undue ambiguity.

Similarly, the weights for all connections 520 between the first hidden layer 504 and the second hidden layer 506 make up a second array of weights. The second array of weights will have L rows, one for each neuron in the first hidden layer 504, and a number of columns equal to the number of neurons in the second hidden layer 506. Likewise, a second bias vector and second activation functions may be defined to relate the first hidden layer 504 to the second hidden layer 504. The values of the neurons for the second hidden layer 506 are likewise determined using Equation (5) as before, but with the second array of weights, second bias vector, and second activation functions. Similarly, values of the neurons for the third hidden layer 508 may be likewise determined using Equation (5) as before, but with the third array of weights, third bias vector, and third activation functions. This process of determining the values for a hidden layer based on the values of the neurons of the previous layer and associated array of weights, bias vector, and activation functions is repeated for all layers in the neural network. As stated above, the number of layers in a neural network is a hyperparameter of the neural network 500.

It is noted that FIG. 5 depicts a simple and general neural network 500. In some embodiments, the neural network 500 may contain specialized layers, such as a normalization layer, or additional connection procedures, like concatenation. One skilled in the art will appreciate that these alterations do not exceed the scope of this disclosure. For example, neural network 500 with only connections 520 passing signals forward from the input layer 502 to the first hidden layer 504, from the first hidden layer 504 to the second hidden layer 506 and so forth constitutes a feed-forward neural network. However, in some embodiments a neural network may have any number of connections, such as connection 540, that passes the output of a neuron 514 backward to the input of the same neuron 512, and/or any number of connections 542 that passes the output of the neuron 512 in a hidden layer, such as hidden layer 506 backward to the input of a neuron in a preceding hidden layer, such as hidden layer 504. A neural network with backward-passing connections, such as connection 540 and 542 may be termed a recurrent neural network.

For a neural network 500 to complete a "task" of predicting an output from an input, the neural network 500 should first be trained. Training may be defined as the process of determining the values of all the weights and biases for each weight array and bias vector encompassed by the neural network 500.

To begin training the weights and biases are assigned initial values. These values may be assigned randomly, assigned according to a prescribed distribution, assigned manually, or by some other assignment mechanism. Once the weights and biases have been initialized, the neural network 500 may act as a function, such that it may receive inputs and produce an output. As such, at least one input is propagated through the neural network 500 to produce an output.

Training of the model may be supervised or unsupervised. According to a supervised training plan, a training dataset is composed of labeled inputs and associated target(s), where the target(s) represent the "ground truth", or the otherwise desired output. That is, the training dataset may be a plurality of input data (e.g., images of cuttings) and a plurality of output data (e.g., the lithology vectors associated with the images) either of which are observed or simulated. The neural network 500 output is compared to the associated input data target(s) (i.e., the image/vector pairs of the balanced training set). The comparison of the neural network 500 output to the target(s) is typically performed by a so-called "loss function"; although other names for this comparison function such as "error function", "objective function", "misfit function", and "cost function" are commonly employed. Many types of loss functions are available, such as the mean-squared-error function, however, the general characteristic of a loss function is that the loss function provides a numerical evaluation of the similarity between the neural network 500 output and the associated target(s). The loss function may also be constructed to impose additional constraints on the values assumed by the weights and biases, for example, by adding a penalty term, which may be physics-based, or a regularization term. Generally, the goal of a training procedure is to alter the weights and biases to promote similarity between the neural network 500 output and associated target(s) over the training dataset. Thus, the loss function is used to guide changes made to the weights and biases, typically through a process called "backpropagation".

While a full review of the backpropagation process exceeds the scope of this disclosure, a brief summary is provided. Backpropagation consists of computing the gradient of the loss function over the weights and biases. The gradient indicates the direction of change in the weights and biases that results in the greatest change to the loss function. Because the gradient is local to the current weights and biases, the weights and biases are typically updated by a "step" in the direction indicated by the gradient. The step size is often referred to as the "learning rate" and need not remain fixed during the training process. Additionally, the step size and direction may be informed by previously seen weights and biases or previously computed gradients. Such methods for determining the step direction are usually referred to as "momentum" based methods.

Once the weights and biases have been updated, or altered from their initial values, through a backpropagation step, the neural network 500 will likely produce different outputs. Thus, the procedure of propagating at least one input through the neural network 500, comparing the neural network 500 output with the associated target(s) with a loss function, computing the gradient of the loss function with respect to the weights and biases, and updating the weights and biases with a step guided by the gradient, is repeated until a termination criterion is reached. Common termination criteria are: reaching a fixed number of updates, otherwise known as an iteration counter; a diminishing learning rate; noting no appreciable change in the loss function between iterations; reaching a specified performance metric as evaluated on the data or a separate hold-out dataset. Once the termination criterion is satisfied, and the weights and biases are no longer intended to be altered, the neural network 500 is said to be "trained".

Using the balanced training dataset prepared according to embodiments of the present disclosure, a machine learning engine (e.g., a neural network) may be trained to provide greater accuracy for automated lithology identification.

Figure 6:
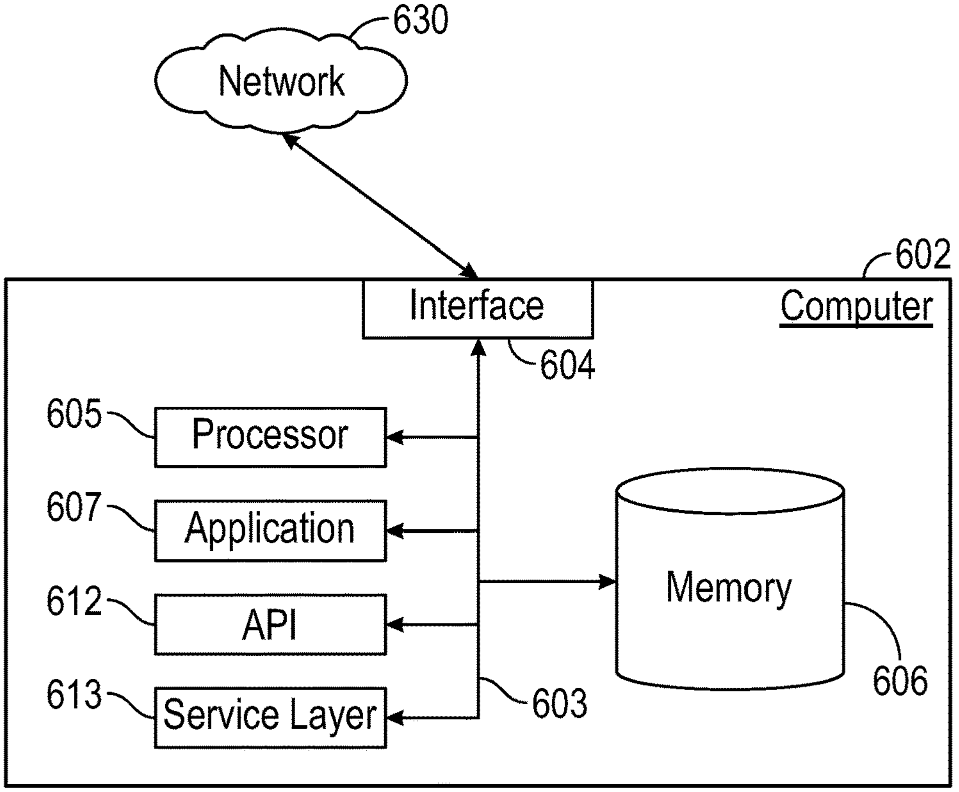
FIG. 6 shows a computer system in accordance with one or more embodiments.

FIG. 6 depicts a block diagram of a computer system 602 used to provide computational functionalities associated with described algorithms, methods, functions, processes, flows, and procedures as described in this disclosure, according to one or more embodiments. For example, the computer system 602, and the processor of the computer system, may be used to perform one or more steps of the flowchart (calculations, determinations, etc.) in FIGS. 1 and 3 and to implement the machine learning engine of FIG. 5.

The illustrated computer 602 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 602 may include a computer that includes an input device, such as a keypad, keyboard, touch screen, or other device that can accept user information, and an output device that conveys information associated with the operation of the computer 602, including digital data, visual, or audio information (or a combination of information), or a GUI.

The computer 602 can serve in a role as a client, network component, a server, a database or other persistency, or any other component (or a combination of roles) of a computer system for performing the subject matter described in the instant disclosure. The illustrated computer 602 is communicably coupled with a network 630. In some implementations, one or more components of the computer 602 may be configured to operate within environments, including cloud-computing-based, local, global, or other environment (or a combination of environments).

At a high level, the computer 602 is an electronic computing device operable to receive, transmit, process, store, or manage data and information associated with the described subject matter. According to some implementations, the computer 602 may also include or be communicably coupled with an application server, e-mail server, web server, caching server, streaming data server, business intelligence (BI) server, or other server (or a combination of servers).

The computer 602 can receive requests over network 630 from a client application (for example, executing on another computer 602) and responding to the received requests by processing the said requests in an appropriate software application. In addition, requests may also be sent to the computer 602 from internal users (for example, from a command console or by other appropriate access method), external or third-parties, other automated applications, as well as any other appropriate entities, individuals, systems, or computers.

Each of the components of the computer 602 can communicate using a system bus 603. In some implementations, any or all of the components of the computer 602, both hardware or software (or a combination of hardware and software), may interface with each other or the interface 604 (or a combination of both) over the system bus 603 using an application programming interface (API) 612 or a service layer 613 (or a combination of the API 612 and service layer 613. The API 612 may include specifications for routines, data structures, and object classes. The API 612 may be either computer-language independent or dependent and refer to a complete interface, a single function, or even a set of APIs. The service layer 613 provides software services to the computer 602 or other components (whether or not illustrated) that are communicably coupled to the computer 602. The functionality of the computer 602 may be accessible for all service consumers using this service layer. Software services, such as those provided by the service layer 613, provide reusable, defined business functionalities through a defined interface. For example, the interface may be software written in JAVA, C++, or other suitable language providing data in extensible markup language (XML) format or another suitable format. While illustrated as an integrated component of the computer 602, alternative implementations may illustrate the API 612 or the service layer 613 as stand-alone components in relation to other components of the computer 602 or other components (whether or not illustrated) that are communicably coupled to the computer 602. Moreover, any or all parts of the API 612 or the service layer 613 may be implemented as child or sub-modules of another software module, enterprise application, or hardware module without departing from the scope of this disclosure.

The computer 602 includes an interface 604. Although illustrated as a single interface 604 in FIG. 6, two or more interfaces 604 may be used according to particular needs, desires, or particular implementations of the computer 602. The interface 604 is used by the computer 602 for communicating with other systems in a distributed environment that are connected to the network 630. Generally, the interface 604 includes logic encoded in software or hardware (or a combination of software and hardware) and operable to communicate with the network 630. More specifically, the interface 604 may include software supporting one or more communication protocols associated with communications such that the network 630 or interface's hardware is operable to communicate physical signals within and outside of the illustrated computer 602.

The computer 602 includes at least one computer processor 605. Although illustrated as a single computer processor 605 in FIG. 6, two or more processors may be used according to particular needs, desires, or particular implementations of the computer 602. Generally, the computer processor 605 executes instructions and manipulates data to perform the operations of the computer 602 and any machine learning networks, algorithms, methods, functions, processes, flows, and procedures as described in the instant disclosure.

The computer 602 also includes a memory 606 that holds data for the computer 602 or other components (or a combination of both) that can be connected to the network 630. For example, memory 606 can be a database storing data consistent with this disclosure. Although illustrated as a single memory 606 in FIG. 6, two or more memories may be used according to particular needs, desires, or particular implementations of the computer 602 and the described functionality. While memory 606 is illustrated as an integral component of the computer 602, in alternative implementations, memory 606 can be external to the computer 602.

The application 607 is an algorithmic software engine providing functionality according to particular needs, desires, or particular implementations of the computer 602, particularly with respect to functionality described in this disclosure. For example, application 607 can serve as one or more components, modules, applications, etc. Further, although illustrated as a single application 607, the application 607 may be implemented as multiple applications 607 on the computer 602. In addition, although illustrated as integral to the computer 602, in alternative implementations, the application 607 can be external to the computer 602.

There may be any number of computers 602 associated with, or external to, a computer system containing a computer 602, wherein each computer 602 communicates over network 630. Further, the term "client," "user," and other appropriate terminology may be used interchangeably as appropriate without departing from the scope of this disclosure. Moreover, this disclosure contemplates that many users may use one computer 602, or that one user may use multiple computers 602.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method comprising:

receiving a plurality of images of cuttings from a geological formation;

generating a lithology vector associated with each image of the plurality of images to form an image/vector set comprising a plurality of image/vector pairs, the lithology vector comprising a plurality of rock types and a percentage of each of the plurality of rock types identified in a respective image;

balancing the image/vector set based on an occurrence of the plurality of rock types across the plurality of image/vector pairs to generate a balanced training set, wherein balancing the image/vector set accounts for underrepresented rock types in one or more of the plurality of image/vector pairs;

providing the balanced training set to a machine-learning engine; and training the machine-learning engine using the balanced training set.

2. The method according to claim 1, wherein balancing the image/vector set comprises:

determining a vector sum across the plurality of image/vector pairs for each of the plurality of rock types and a lower sum threshold value;

in response to determining that a respective vector sum is less than the lower sum threshold value, excluding from the image/vector set, all rock types having a vector sum less than the lower sum threshold value to generate a modified image/vector set;

determining a repetition vector based on the modified image/vector set and the plurality of rock types; and repeating and storing each image/vector pair in the image/vector set according to the repetition vector.

3. The method according to claim 2, wherein excluding all rock types comprises one of:

flagging each rock type associated with the respective vector sum as unknown; or removing all image/vector pairs having a vector sum less than the lower sum threshold value.

4. The method according to claim 3, wherein rock types flagged as unknown are summed together within the image/vector set.

5. The method according to claim 2, wherein determining the repetition vector comprises:

determining a minimization factor corresponding to a most nearly equal representation of rock types;

generating a matrix having each lithology vector as a row;

determining a mean value of each lithology vector; and rounding off each percentage based on the mean value and the minimization factor.

6. The method according to claim 1, wherein each of the plurality of images is linked to a depth in the geological formation at which a respective cutting was obtained.

7. The method according to claim 1, wherein a sum of each lithology vector equals 1.

8. A non-transitory computer readable medium comprising instructions that when executed by a processor cause the processor to perform a method comprising:

receiving a plurality of images of cuttings from a geological formation;

generating a lithology vector associated with each image of the plurality of images to form an image/vector set comprising a plurality of image/vector pairs, the lithology vector comprising a plurality of rock types and a percentage of each rock type identified in a respective image;

balancing the image/vector set based on an occurrence of the plurality of rock types across the plurality of image/vector pairs to generate a balanced training set, wherein balancing the image/vector set accounts for underrepresented rock types in one or more of the plurality of image/vector pairs;

providing the balanced training set to a machine-learning engine; and training the machine-learning engine using the balanced training set.

9. The non-transitory computer readable medium according to claim 8, wherein balancing the image/vector set comprises:

determining a vector sum across the plurality of image/vector pairs for each of the plurality of rock types and a lower sum threshold value;

in response to determining that a respective vector sum is less than the lower sum threshold value, excluding from the image/vector set, all rock types having a vector sum less than the lower sum threshold value to generate a modified image/vector set;

determining a repetition vector based on the modified image/vector set and the plurality of rock types; and repeating and storing each image/vector pair in the image/vector set according to the repetition vector.

10. The non-transitory computer readable medium according to claim 9, wherein excluding all rock types comprises one of:

flagging each rock type associated with the respective vector sum as unknown; or removing all image/vector pairs having a vector sum less than the lower sum threshold value.

11. The non-transitory computer readable medium according to claim 10, wherein rock types flagged as unknown are summed together within the image/vector set.

12. The non-transitory computer readable medium according to claim 9, wherein determining the repetition vector comprises:

determining a minimization factor corresponding to a most nearly equal representation of rock types;

generating a matrix having each lithology vector as a row;

determining a mean value of each lithology vector; and rounding off each percentage based on the mean value.

13. The non-transitory computer readable medium according to claim 8, wherein each of the plurality of images is linked to a depth in the geological formation at which a respective cutting was obtained.

14. The non-transitory computer readable medium according to claim 8, wherein a sum of each lithology vector equals 1.

* * * * *